United States Patent
Oikawa

(10) Patent No.: US 10,456,706 B2
(45) Date of Patent: Oct. 29, 2019

(54) CRYOPUMP

(71) Applicant: Sumitomo Heavy Industries, Ltd, Tokyo (JP)

(72) Inventor: Ken Oikawa, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 384 days.

(21) Appl. No.: 14/301,719

(22) Filed: Jun. 11, 2014

(65) Prior Publication Data

US 2014/0366562 A1 Dec. 18, 2014

(30) Foreign Application Priority Data

Jun. 14, 2013 (JP) ................... 2013-125819

(51) Int. Cl.
*F04B 37/08* (2006.01)
*B01D 8/00* (2006.01)

(52) U.S. Cl.
CPC ............... *B01D 8/00* (2013.01); *F04B 37/08* (2013.01)

(58) Field of Classification Search
CPC .................................. B01D 8/00; F04B 37/08
USPC ....................................................... 62/55.5
See application file for complete search history.

(56) References Cited

U.S. PATENT DOCUMENTS

| 4,277,951 A | 7/1981 | Longsworth |
| 4,449,373 A | 5/1984 | Peterson et al. |
| 4,791,791 A | 12/1988 | Flegal et al. |
| 8,800,304 B2 | 8/2014 | Koyama |
| 9,032,741 B2 | 5/2015 | Tanaka |
| 9,266,038 B2 | 2/2016 | Syssoev et al. |
| 2008/0168778 A1 | 7/2008 | Bartlett et al. |
| 2008/0184712 A1* | 8/2008 | Longsworth .......... F04B 37/085 62/55.5 |
| 2009/0282841 A1 | 11/2009 | Tanaka |
| 2013/0276466 A1* | 10/2013 | Longsworth ............. B01D 8/00 62/55.5 |

FOREIGN PATENT DOCUMENTS

| CN | 102686880 A | 9/2012 |
| CN | 102828929 A | 12/2012 |
| JP | S59/218371 A | 12/1984 |
| JP | 2009-275672 A | 11/2009 |
| JP | 2010-014066 A | 1/2010 |
| KR | 20000015118 A | 3/2000 |
| TW | 201239196 A | 10/2012 |
| WO | WO-2012109304 A2 | 8/2012 |

* cited by examiner

*Primary Examiner* — John F Pettitt, III
(74) *Attorney, Agent, or Firm* — Michael Best & Friedrich LLP

(57) ABSTRACT

A cryopump includes a cryopump including: a refrigerator; a first cryopanel including a radiation shield; and a second cryopanel enclosed by the first cryopanel and cooled to a lower temperature than that of the first cryopanel. The radiation shield includes an attaching pedestal located lateral to the second cryopanel for attachment of the refrigerator to the radiation shield, and a shield portion adjacent to the attaching pedestal and enclosing the second cryopanel. A lateral gap is formed between the second cryopanel and the attaching pedestal. A gap part continuing into the lateral gap is formed between the second cryopanel and the shield portion. The second cryopanel is shaped and/or located such that the lateral gap is comparable in width to the gap part.

6 Claims, 6 Drawing Sheets

CRYOPUMP

BACKGROUND OF THE INVENTION

1. Field of the Invention

The present invention relates to a cryopump.

2. Description of the Related Art

A cryopump normally includes two kinds of cryopanels with different temperatures. Gases condense on a lower-temperature cryopanel. Along with use of the cryopump, a condensing layer grows on the lower-temperature cryopanel and can eventually contact a higher-temperature cryopanel. In this case, gases vaporize again at a contacting part between the higher-temperature cryopanel and the condensing layer and are released into the environment. Since then, the cryopump cannot play an actual role sufficiently. Thus, the total amount of gas condensed at this time provides a maximum amount of gas condensed in the cryopump.

SUMMARY OF THE INVENTION

An exemplary purpose of an embodiment of the present invention is to increase an amount of gas condensed in a cryopump.

According to an aspect of the present invention, there is provided a cryopump including: a refrigerator including a first stage and a second stage cooled to a lower temperature than that of the first stage; a first cryopanel including a radiation shield having a main opening and an inlet cryopanel disposed at the main opening, the first cryopanel thermally connected to the first stage; and a second cryopanel enclosed by the first cryopanel and thermally connected to the second stage. The radiation shield includes an attaching pedestal located lateral to the second cryopanel for attachment of the refrigerator to the radiation shield, and a shield portion adjacent to the attaching pedestal and enclosing the second cryopanel. A lateral gap is formed between the second cryopanel and the attaching pedestal. A gap part continuing into the lateral gap is formed between the second cryopanel and the shield portion. The second cryopanel is shaped and/or located such that the lateral gap is comparable in width to the gap part.

Optional combinations of the aforementioned constituting elements, and implementations of the invention in the form of methods, apparatuses, and systems, may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

Figure 1:
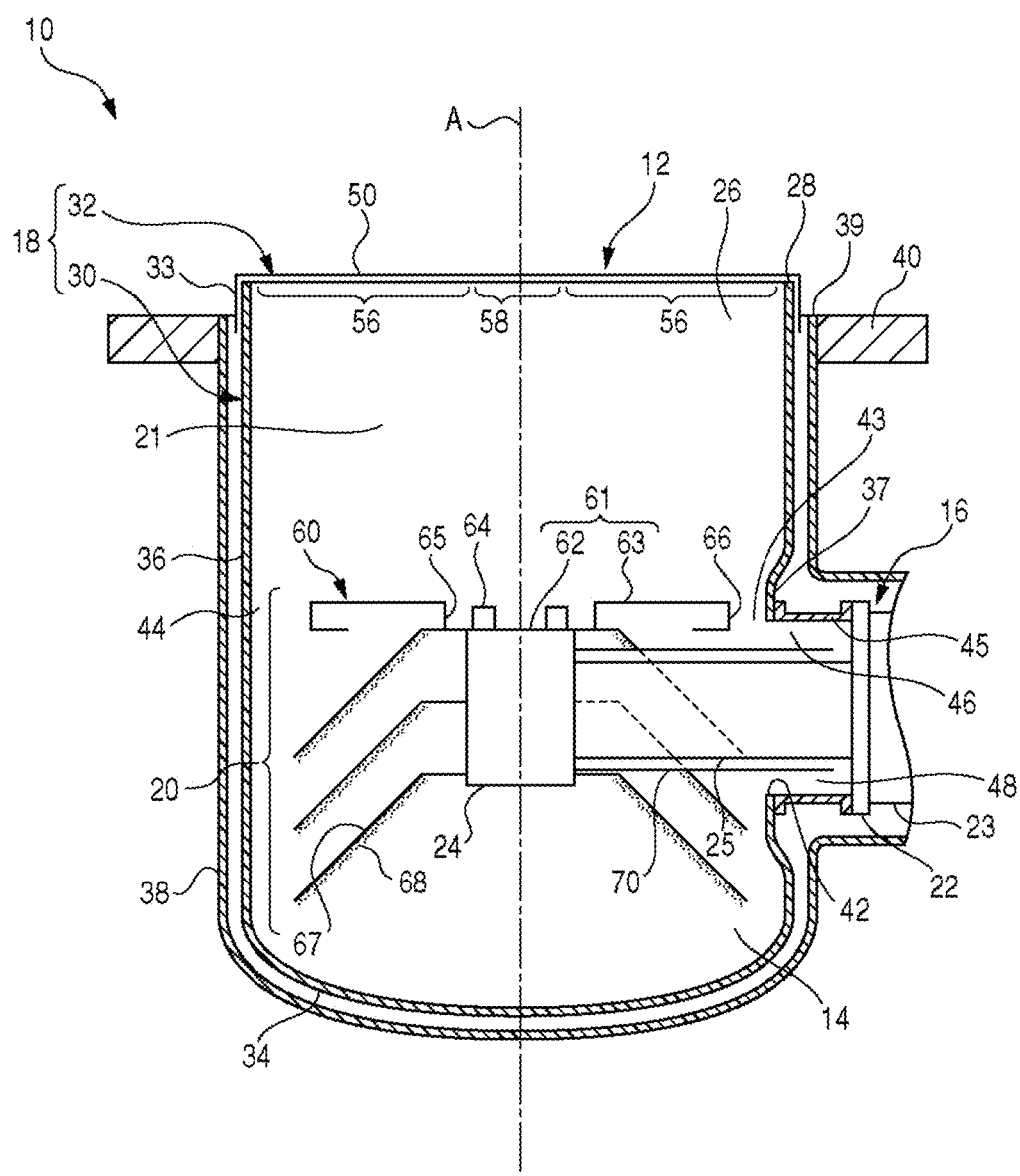
FIG. 1 is a schematic sectional side view of a main part of a cryopump according to a first embodiment of the present invention.

FIG. 1 is a schematic sectional side view of a main part of a cryopump 10 according to a first embodiment of the present invention. The cryopump 10 is mounted on a vacuum chamber of, for example, an ion implantation apparatus or a sputtering apparatus and used to increase the degree of vacuum inside the vacuum chamber to a level demanded by a desired process. The cryopump 10 includes an inlet 12 to receive gases. Gases to be pumped flow from the vacuum chamber on which the cryopump 10 is mounted, through the inlet 12, into an internal space 14 of the cryopump 10. FIG. 1 is a cross-sectional view including a central axis A of the internal space 14 of the cryopump 10.

Note that terms "axial direction" and "radial direction" may be used herein to facilitate an understanding of a positional relationship among components of the cryopump 10. The axial direction represents a direction through the inlet 12 (a direction along the dashed-dotted line A in FIG. 1), and the radial direction represents a direction along the inlet 12 (a direction perpendicular to the dashed-dotted line A). For convenience, relative closeness to the inlet 12 in the axial direction may be described by terms such as "upper" and "upward," and relative remoteness therefrom may be described by terms such as "lower" and "downward." In other words, relative remoteness from the bottom of the cryopump 10 may be described by terms such as "upper" and "upward," and relative closeness thereto may be described by terms such as "lower" and "downward," both in the axial direction. Relative closeness to a center (the central axis A in FIG. 1) of the inlet 12 in the radial direction may be described by terms such as "inner" and "inside," and relative closeness to the circumference of the inlet 12 in the radial direction may be described by terms such as "outer" and "outside." The radial direction may also be referred to as a direction of a radius. It should be noted here that these terms are not related to a position of the cryopump 10 as mounted on a vacuum chamber. For example, the cryopump 10 may be mounted on a vacuum chamber with the inlet 12 facing downward in the vertical direction.

Also, a direction surrounding the axial direction may be described by a term such as "a circumferential direction." The circumferential direction is a second direction along the inlet 12 and a tangential direction orthogonal to the radial direction.

The cryopump 10 includes a refrigerator 16. The refrigerator 16 is a cryogenic refrigerator, such as a Gifford-McMahon type refrigerator (generally called a GM refrigerator). The refrigerator 16 is a two-stage refrigerator including a first stage 22 and a second stage 24. The refrigerator 16 is configured to cool the first stage 22 to a first temperature level and the second stage 24 to a second temperature level. The second temperature level is lower than the first temperature level. For example, the first stage 22 is cooled to approximately 65 K to 120 K, and preferably to 80 K to 100 K, while the second stage 24 is cooled to approximately 10 K to 20 K.

Also, the refrigerator 16 includes a first cylinder 23 and a second cylinder 25. The first cylinder 23 connects a room temperature portion of the refrigerator 16 to the first stage 22. The second cylinder 25 is a connecting portion connecting the first stage 22 to the second stage 24.

The cryopump 10 illustrated in the figure is a so-called horizontal-type cryopump. A horizontal-type cryopump is generally a cryopump arranged such that the refrigerator 16 intersects (orthogonally in general) with the central axis A of the internal space 14 of the cryopump 10.

The cryopump 10 includes a first cryopanel 18 and a second cryopanel 20 cooled to a lower temperature than that of the first cryopanel 18. The first cryopanel 18 includes a radiation shield 30 and a plate member 32, and encloses the second cryopanel 20. Details of the first cryopanel 18 will be described later. Between the plate member 32 and the second cryopanel 20 is formed a main accommodating space 21 for a condensing layer.

The second cryopanel 20 will now be described. The second cryopanel 20 is arranged in a center part of the internal space 14 of the cryopump 10. The second cryopanel 20 is attached to the second stage 24 so as to surround the second stage 24. Hence, the second cryopanel 20 is thermally connected to the second stage 24, and the second cryopanel 20 is cooled to the second temperature level.

The second cryopanel 20 includes a top panel 60. The top panel 60 is attached directly to an upper surface of the second stage 24 of the refrigerator 16. The second stage 24 is located at the center part of the internal space 14 of the cryopump 10. In this way, the main accommodating space 21 for a condensing layer occupies the upper half of the internal space 14.

The top panel 60 is provided to condense gases on a surface thereof. The top panel 60 is a part proximate to the plate member 32 in the second cryopanel 20 and includes a top panel front face 61 opposed to the plate member 32. The top panel front face 61 includes a central region 62 and an outside region 63 surrounding the central region 62.

Figure 2:
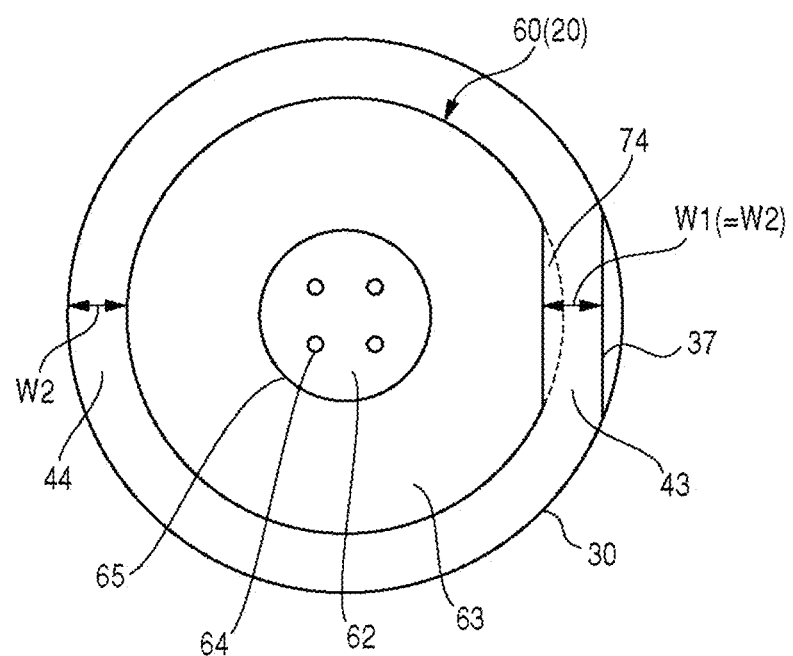
FIG. 2 is an upper view schematically illustrating a top panel according to the first embodiment of the present invention.
Figure 5:
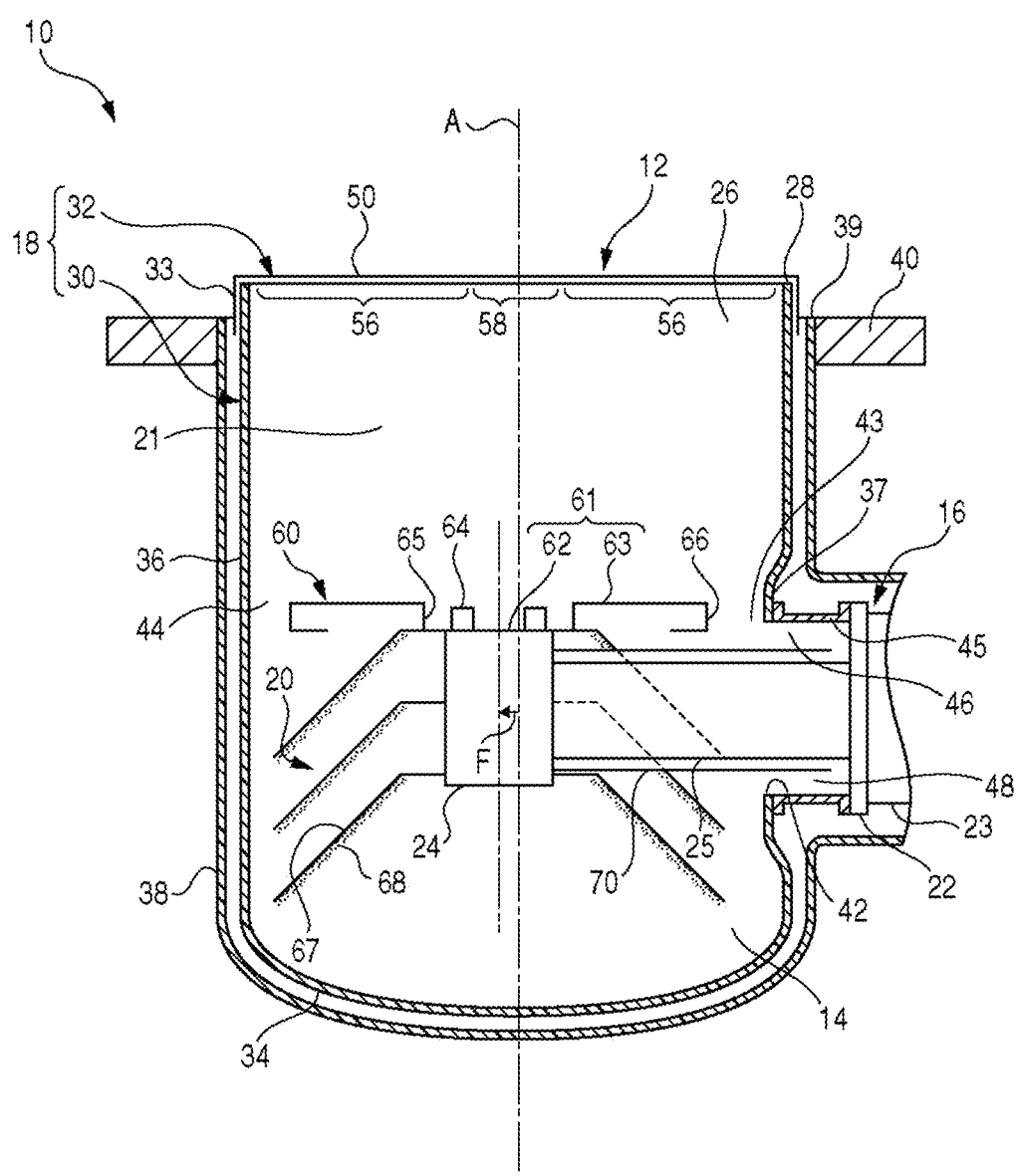
FIG. 5 is a schematic sectional side view of a main part of a cryopump according to a second embodiment of the present invention.

The top panel 60 is a roughly flat-plate-like cryopanel arranged perpendicularly to the axial direction. The top panel 60 is fixed at the central region 62 to the second stage 24. The central region 62 has a recess, at which the top panel 60 is fixed to the second stage 24 with use of an appropriate fixing member 64, e.g., a bolt, as shown in FIGS. 2 and 5. Around the recess is formed a step 65 extending upward. A height of the step 65 is determined to accommodate the fixing member 64 in the recess. The outside region 63 extends outward in the radial direction from the step 65. An end of the outside region 63 in the radial direction is bent downward, and an outer circumferential portion 66 of the top panel 60 is formed. The top panel 60 is a disk-like panel as illustrated in FIG. 2.

Note that the top panel 60 may not include the recess in the central region 62 accommodating the fixing member 64. In this case, the top panel front face 61 may be a flat surface not having the step 65. Also, although the top panel 60 does not have an adsorbent in the present embodiment, the top panel 60 may be provided, for example, at a back face thereof, with an adsorbent.

FIG. 2 is an upper view schematically illustrating the top panel 60 according to the first embodiment of the present invention. The shape of the second cryopanel 20 is adjusted so that the width W1 of a lateral gap 43 and the width W2 of a gap part 44 may correspond to each other. That is, the width W1 of the lateral gap 43 and the width W2 of the gap part 44 are substantially equal. To this end, the top panel 60 has a cut-out portion 74 widening the lateral gap 43. This cut-out portion 74 is formed in a bow-like shape. Note that normal panels 67 (cf. FIG. 1) below the top panel 60 may have cut-out portions in a similar manner.

The second cryopanel 20 includes one or a plurality of normal panels 67. Each of the normal panels 67 is provided to condense or adsorb gases on a surface thereof. The normal panels 67 are arranged on a lower side of the top panel 60. Each of the normal panels 67 has a different shape from that of the top panel 60. Each of the normal panels 67 has a shape of the side surface of a truncated cone, i.e., an umbrella-like shape. An adsorbent 68 such as activated charcoal is provided on each of the normal panels 67. The adsorbent is, for example, attached to the back face of each of the normal panels 67. The front face of each of the normal panels 67 is intended to function as a condensing surface while the back face is intended to function as an adsorbing surface.

The first cryopanel 18 is a cryopanel provided to protect the second cryopanel 20 from radiant heat emitted from the outside of the cryopump 10 or a cryopump housing 38. The first cryopanel 18 is thermally connected to the first stage 22. Thus, the first cryopanel 18 is cooled to the first temperature level. A gap is provided between the first cryopanel 18 and the second cryopanel 20, and the first cryopanel 18 does not contact the second cryopanel 20.

The radiation shield 30 is provided to protect the second cryopanel 20 from radiant heat emitted from the cryopump housing 38. The radiation shield 30 is located between the cryopump housing 38 and the second cryopanel 20, and encloses the second cryopanel 20. The radiation shield 30 includes the shield front end 28 defining a shield opening 26 as a main opening, a shield bottom portion 34 opposed to the shield opening 26, and a shield side portion 36 extending from the shield front end 28 to the shield bottom portion 34. The shield opening 26 is located at the inlet 12. The radiation shield 30 has a tubular shape (for example, cylindrical) with the shield bottom portion 34 closed to be formed into a cup-like shape.

The radiation shield 30 includes an attaching pedestal 37 for the refrigerator 16. The attaching pedestal 37 is dented as seen from the outside of the radiation shield 30 and forms on the shield side portion 36 a flat part for attachment of the refrigerator 16 to the radiation shield 30. The attaching pedestal 37 is located lateral to the second cryopanel 20. Since the top panel 60 is attached directly to the upper surface of the second stage 24 of the refrigerator 16 as described above and is thus as high as the second stage 24, the attaching pedestal 37 is located lateral to the top panel 60.

Figure 3:
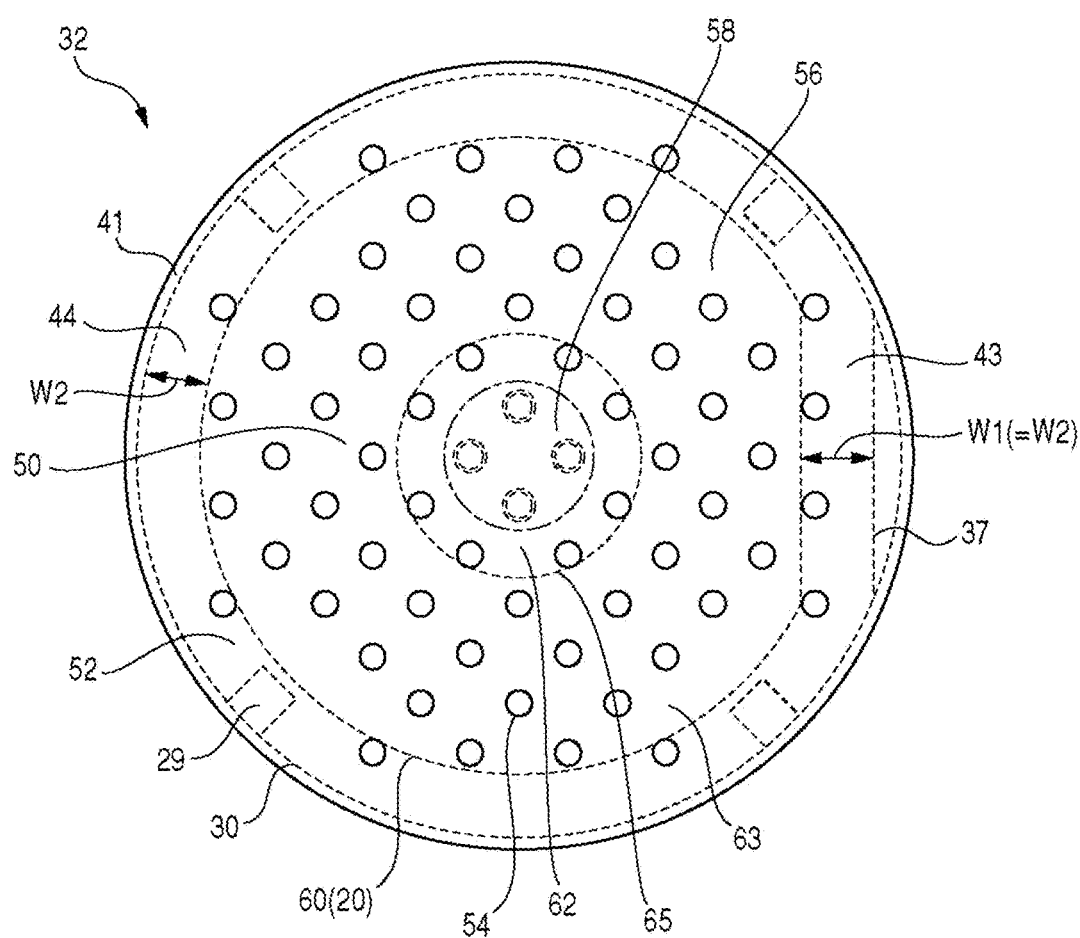
FIG. 3 is an upper view schematically illustrating a plate member according to the first embodiment of the present invention.

The shield side portion 36 generally forms a closed annular part. The shield side portion 36 includes the attaching pedestal 37 and an opened annular part 41, as shown in FIG. 3. The opened annular part 41 is a C-shaped part extending in the circumferential direction and is adjacent to the attaching pedestal 37 in the circumferential direction. The opened annular part 41 as well as the attaching pedestal 37 surrounds the second cryopanel 20 to form a closed annular part. The lateral gap 43 is formed between the second cryopanel 20 and the attaching pedestal 37. The C-shaped gap part 44 is formed between the second cryopanel 20 and the opened annular part 41. The gap part 44 continues into the lateral gap 43 to form a closed annular gap. The gap part 44 has a constant width in the circumferential direction.

As illustrated in FIG. 1, the attaching pedestal 37 has an attaching hole 42 for the refrigerator 16, and the second stage 24 and the second cylinder 25 of the refrigerator 16 are inserted into the radiation shield 30 through the attaching hole 42. The first stage 22 of the refrigerator 16 is arranged outside the radiation shield 30. The radiation shield 30 is connected to the first stage 22 via a heat transfer member 45. The heat transfer member 45 is fixed to an outer circumferential portion of the attaching hole 42 by a flange at one end thereof and is fixed to the first stage 22 by a flange at the other end thereof. The heat transfer member 45 is, for example, a hollow-centered short tube, and extends between the radiation shield 30 and the first stage 22 along a central axis of the refrigerator 16. The radiation shield 30 is thermally connected to the first stage 22 in this way. Note that the radiation shield 30 may be attached directly to the first stage 22.

Between the second cylinder 25 and the attaching hole 42, an upper gap 46 is formed on a side closer to the shield opening 26, and a lower gap 48 is formed on a side further away from the shield opening 26. Since the refrigerator 16 is inserted in a center of the attaching hole 42, a width of the upper gap 46 is equal to a width of the lower gap 48.

In the present embodiment, the radiation shield 30 is formed as a one-piece tube as illustrated in the figure. Alternatively, as for the radiation shield 30, a plurality of parts may form a tubular shape as a whole. The plurality of parts may be arranged so as to have a gap between one another. For example, the radiation shield 30 may be segmented into two parts in the axial direction. In this case, an upper portion of the radiation shield 30 is a tube having ends that are both open and includes the shield front end 28 and a first part of the shield side portion 36. A lower portion of the radiation shield 30 has an open upper end and a closed lower end and hence includes a second part of the shield side portion 36 and the shield bottom portion 34. Between the first part and the second part of the shield side portion 36 is formed a gap extending in the circumferential direction. As for the attaching hole 42 for the refrigerator 16, an upper half thereof is formed in the first part of the shield side portion 36 while a lower half thereof is formed in the second part of the shield side portion 36.

The cryopump 10 is provided with a refrigerator cover 70 enclosing the second cylinder 25 of the refrigerator 16. The refrigerator cover 70 is formed in a cylindrical shape having a slightly larger diameter than that of the second cylinder 25, is attached at one end to the second stage 24, and extends through the attaching hole 42 of the radiation shield 30 toward the first stage 22. A gap is provided between the refrigerator cover 70 and the radiation shield 30, and the refrigerator cover 70 and the radiation shield 30 do not contact each other. The refrigerator cover 70 is thermally connected to the second stage 24 and is cooled to an equal temperature to that of the second stage 24. Accordingly, the refrigerator cover 70 is also regarded as a part of the second cryopanel 20.

The plate member 32 is an inlet cryopanel provided at the inlet 12 (or the shield opening 26, the same is true below) to protect the second cryopanel 20 from radiant heat emitted from a heat source outside the cryopump 10. The heat source outside the cryopump 10 is, for example, a heat source inside the vacuum chamber on which the cryopump 10 is mounted. The entry of molecules of gases, in addition to the radiant heat, is also limited. The plate member 32 occupies a part of an opening area of the inlet 12 so as to limit a flow of gases through the inlet 12 into the internal space 14 to a desired quantity. The plate member 32 covers a major portion of the inlet 12. Also, gases (for example, moisture) that condense at cooling temperatures of the plate member 32 are trapped on a surface thereof.

There is a slight gap between the shield front end 28 and the plate member 32 in the axial direction. The plate member 32 includes a skirt 33 to cover the gap to restrict a flow of gases. The skirt 33 is a short tube surrounding the plate member 32. The skirt 33 and the plate member 32 form a one-piece structure resembling a circular tray with the plate member 32 as a bottom surface of the tray. This circular tray structure is arranged to cover the radiation shield 30. Hence, the skirt 33 protrudes downward from the plate member 32 in the axial direction and in proximity to the shield front end 28 in the radial direction. A distance between the skirt 33 and the shield front end 28 in the radial direction is, for example, in the order of a dimensional tolerance of the radiation shield 30.

The gap between the shield front end 28 and the plate member 32 may vary according to a manufacturing error. Such an error may be reduced by precise machining and assembly of components, which may not be practical, though, because of possible increases in manufacturing costs. The error contributes to an individual difference of the cryopump 10. In a case where the skirt 33 is not provided, a quantity of gases flowing into the inside of the radiation shield 30 changes depending on a size of the gap. The quantity of entry of gases is directly related to the pumping speed of the cryopump 10. A gap which is excessively large or small causes an actual pumping speed to deviate from a design performance thereof. The flow of gases through the gap is restricted by covering the gap between the shield front end 28 and the plate member 32 with the skirt 33, which reduces the individual difference. This, as a result, also reduces an individual difference in the pumping speed of cryopumps in reference to the design performance.

A shield front end 28 and the plate member 32 are arranged at an upper side in the axial direction over an inlet flange 40 of the cryopump housing 38. In this way, the radiation shield 30 extends toward the vacuum chamber on which the cryopump 10 is mounted. By extending the radiation shield 30 upward, the main accommodating space 21 for a condensing layer can be large in the axial direction. However, the length of the extending part in the axial direction is determined so as not to interfere with the vacuum chamber (or a gate valve between the vacuum chamber and the cryopump 10).

The cryopump housing 38 is a chassis of the cryopump 10 accommodating the first cryopanel 18, the second cryopanel 20, and the refrigerator 16 and is a vacuum vessel configured to gas-tightly maintain vacuum of the internal space 14. A front end 39 of the cryopump housing 38 defines the inlet 12. The cryopump housing 38 includes the inlet flange 40 extending outward in the radial direction from the front end 39. The inlet flange 40 is provided around the entire circumference of the cryopump housing 38. The cryopump 10 is attached to the vacuum chamber with use of the inlet flange 40.

FIG. 3 is an upper view schematically illustrating the plate member 32 according to the first embodiment of the present invention. In FIG. 3, the representative components located below the plate member 32 are illustrated by dashed lines.

The plate member 32 includes a single flat plate (for example, a disk) across the shield opening 26. A dimension (for example, a diameter) of the plate member 32 corresponds to a dimension of the shield opening 26. The plate member 32 is classified into a plate main portion 50 and a plate peripheral portion 52. The plate peripheral portion 52 is a rim portion adapted to attach the plate main portion 50 to the radiation shield 30.

The plate member 32 is attached to plate mounts 29 of the shield front end 28. The plate mounts 29 are each a protrusion extending from the shield front end 28 inward in the radial direction and are formed at regular intervals (for example, every 90°) in the circumferential direction. The plate member 32 is fixed to the plate mounts 29 in an appropriate manner. For example, the plate mounts 29 and the plate peripheral portion 52 each have a bolt hole (not shown) to allow the plate peripheral portion 52 to be bolted onto the plate mounts 29.

A large number of pores 54 are formed in the plate member 32 in order to allow the gases to flow therethrough. The pores 54 are through holes formed in the plate main portion 50 and the plate peripheral portion 52. By doing so, gases to be condensed on the second cryopanel 20 (mainly on the top panel 60) can be received through the pores 54 into the main accommodating space 21 between the plate member 32 and the second cryopanel 20. The pores 54 are not formed at positions close to the plate mounts 29 in the plate peripheral portion 52.

The pores 54 are regularly arranged. In the present embodiment, the pores 54 are provided at regular intervals respectively in two orthogonal linear directions to form a lattice of the pores 54. Alternatively, the pores 54 may be provided at regular intervals respectively in the radial and circumferential directions.

The pores 54 are formed, for example, in a circular shape. However, the shape is not limited to this, and the pores 54 may be openings formed in a rectangular shape or in another shape, slits extending in a linear form or in a curved form, or cut-outs formed at an outer circumference of the plate member 32. Each of the pores 54 is obviously smaller than the shield opening 26.

The plate main portion 50 includes a gas passing region 56 having a large number of pores 54 and a gas shielding region 58 formed at a different position in the plate main portion 50 from the position of the gas passing region 56. Accordingly, the plate main portion 50 is classified into the gas passing region 56 and the gas shielding region 58. The gas passing region 56 and the gas shielding region 58 are adjacent to each other. Hence, the plate member 32 has a large number of pores 54 at a part of a surface thereof, which causes the gas passing region 56 to be formed. The plate member 32 is also provided with the gas shielding region 58 locally.

In FIG. 3, a boundary between the gas passing region 56 and the gas shielding region 58 is shown by a dashed-dotted line. In the present embodiment, the boundary between the gas passing region 56 and the gas shielding region 58 is located inside a boundary between the outside region 63 and the central region 62 of the top panel 60 (that is, inside the step 65). In this way, the gas passing region 56 is opposed to the outside region 63 of the top panel 60 while the gas shielding region 58 is opposed to the central region 62 of the top panel 60.

Figure 4:
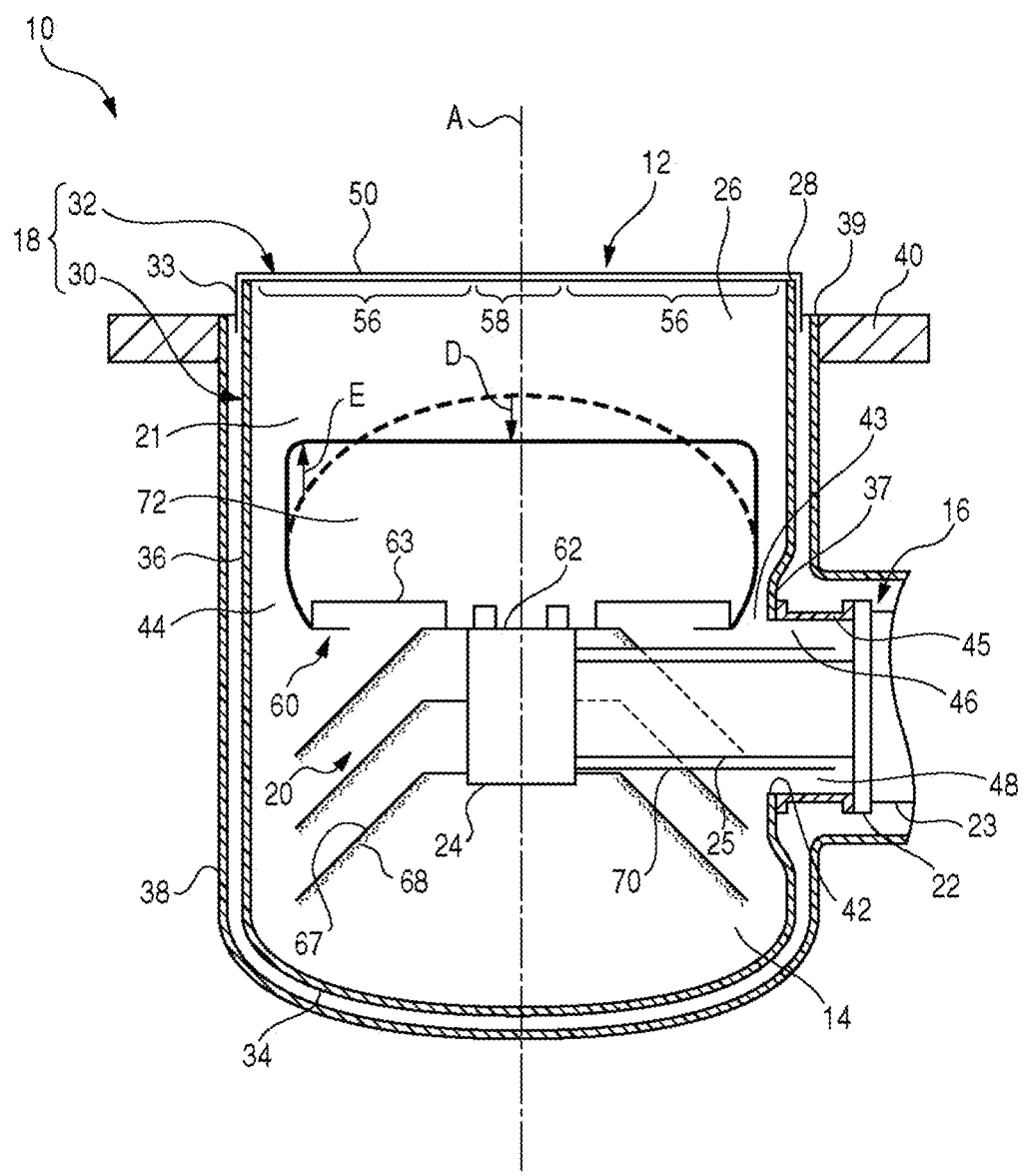
FIG. 4 is a schematic sectional side view of the cryopump during a pumping operation according to the first embodiment of the present invention.

The boundary between the gas passing region 56 and the gas shielding region 58 is set for control of a shape of a condensing layer 72 growing on the top panel front face 61, as shown in FIG. 4. Accordingly, the boundary between the gas passing region 56 and the gas shielding region 58 may differ from that illustrated in the figure in order to grow the condensing layer 72 in a desired shape. This boundary may correspond to, be outside, or intersect with the boundary between the outside region 63 and the central region 62 of the top panel 60. Also, a shape of the boundary between the gas passing region 56 and the gas shielding region 58 may not be limited to a circular shape but may be another arbitrary shape.

The gas shielding region 58 is formed by getting rid of at least one pore from the regular arrangement of the pores 54. As illustrated in FIG. 3, the gas shielding region 58 is a region containing four pores (shown at a center of the plate main portion 50 by the double dashed lines) that would be formed if they followed the regular arrangement of the pores 54 in the gas passing region 56. Since the gas shielding region 58 is not provided with pores, the gas shielding region 58 does not let gases pass therethrough.

The gas shielding region 58 may be provided with at least one pore. For example, the gas shielding region 58 may be formed by not forming pores at all positions of the virtual pores shown by the double dashed lines (that is, by providing a smaller number of pores 54 than the regular arrangement in the gas passing region 56). Alternatively, smaller holes than the pores 54 in the gas passing region 56 may be formed at the positions of the virtual pores. An equal or smaller number of such small openings to or than the number of the positions of the virtual pores may be provided. This can also restrict a flow of gases in the gas shielding region 58 further than in the gas passing region 56.

Accordingly, the gas passing region 56 may be provided with pores in a first distribution while the gas shielding region 58 may be provided with no pores or pores in a second distribution, which differs from the first distribution. For example, the second distribution is determined so that an opening area per unit area in the gas shielding region 58 may be smaller than an opening area per unit area in the gas passing region 56. The opening area herein is a sum of areas of the pores. Also, the first distribution may not have regularity. Thus, the pores 54 in the gas passing region 56 may be irregularly arranged.

Note that the total opening area on the plate member 32 is determined on a design basis according to a demanded performance such as a pumping speed. Accordingly, in getting rid of or narrowing the pores to set the gas shielding region 58, doing so is preferably associated with maintaining the opening area in total. To do so, new pores 54 may be added to the gas passing region 56, or the existing pores 54 may be enlarged. Positions of the existing pores 54 may be changed.

An explanation on the operations of the cryopump 10 with the aforementioned configuration will be given below. Before activating the cryopump 10, the inside of the vacuum chamber is first roughly evacuated to e.g., approximately 1 Pa by using an appropriate roughing pump. The cryopump 10 is then activated. The operation of the refrigerator 16 cools the first stage 22 and the second stage 24, and that also cools the first cryopanel 18 and the second cryopanel 20 thermally connected to these stages. The first cryopanel 18 and the second cryopanel 20 are cooled to the first temperature and the second temperature, which is lower than the first temperature, respectively.

The plate member 32 cools molecules of the gases flowing from the vacuum chamber into the cryopump 10 to cause gases (for example, moisture) having vapor pressures that are sufficiently reduced by a cooling temperature of the plate member 32 to condense on a surface of the plate member 32 for removal. Gases having vapor pressures that are not sufficiently reduced by the cooling temperature of the plate member 32 pass through the many pores 54 to enter the main accommodating space 21. In another case, some of the gases are reflected by the gas shielding region 58 of the plate member 32 and do not enter the main accommodating space 21.

Of the molecules of the gases that have entered, gases (for example, argon) having vapor pressures that are sufficiently reduced by a cooling temperature of the second cryopanel 20 are condensed on a surface of the second cryopanel 20 (mainly, the top panel front face 61) for removal. Gases (for example, hydrogen) having vapor pressures that are not sufficiently reduced by this cooling temperature are adsorbed, for removal, onto the adsorbent 68 that is attached to the surface of the second cryopanel 20 and cooled. In this way, the cryopump 10 can attain a desired degree of vacuum in the vacuum chamber.

FIG. 4 schematically illustrates the cryopump 10 during a pumping operation. As illustrated in FIG. 4, ice or frost made from condensed gases is deposited on the top panel 60 of the cryopump 10. The condensing layer 72 consists primarily of, for example, argon. This ice layer grows and gets thick as the pumping operation time goes by. Note that, in FIG. 4, condensing layers deposited on the normal panels 67 and the refrigerator cover 70 are not illustrated for simplicity.

In a case where the plate member 32 does not have the gas shielding region 58 (that is, in a case where the plate member 32 has the doubled-dashed pores illustrated in FIG. 3), a domed or mushroom condensing layer grows on the top panel 60 as illustrated by the dashed line in FIG. 4. In a case where numerous pores 54 are distributed uniformly on the plate member 32, gases tend to flow into a center of the main accommodating space 21. Thus, concentration of condensation on the center as illustrated in the figure tends to occur. Also, providing a small number of pores 54 in the plate peripheral portion 52 for attachment of the plate member 32 can also cause the concentration of condensation on the center.

When the domed condensing layer further grows in the radial direction, a peripheral portion of the condensing layer can contact the shield side portion 36. Assuming that a narrower clearance is formed between the attaching pedestal 37 and the top panel 60, the condensing layer first contacts the attaching pedestal 37. Then gases vaporize again at the contacting part and are released to the main accommodating space 21 and finally out of the cryopump 10. Since then, the cryopump 10 cannot provide a design pumping performance. Thus, the total amount of gas condensed at this time provides a maximum amount of gas condensed in the cryopump 10. A local part of the condensing layer (in this case, the part of the condensing layer proximate to the attaching pedestal 37) determines a limit of the amount of gas condensed in the cryopump 10.

A cryopump is generally designed to be axisymmetric. However, the horizontal-type cryopump 10 inevitably has an asymmetric part (e.g., the attaching pedestal 37) since the refrigerator 16 is arranged in a horizontal direction. In the present embodiment, the shape of the top panel 60 is conformed to such an asymmetric part to uniform the width of the gap between the top panel 60 and the radiation shield 30. This enables the cryopump 10 to avoid the initial contact onto the radiation shield 30 with a specific portion of the condensing layer on the top panel 60 growing in the radial direction (in this case, the part of the condensing layer proximate to the attaching pedestal 37). As a result, the maximum amount of gas captured in the cryopump 10 is increased according to the present embodiment.

When the domed condensing layer further grows in the axial direction, a top of the condensing layer around the central axis A can contact a lower face of the plate member 32. The total amount of gas condensed at this time provides the maximum amount of gas condensed in the cryopump 10. A local part of the condensing layer (in this case, the top of the condensing layer around the central axis A) determines a limit of the amount of gas condensed in the cryopump 10.

In a case where the plate member 32 has the gas shielding region 58 (that is, in a case where the plate member 32 does not have the doubled-dashed pores illustrated in FIG. 3), a cylindrical condensing layer 72 grows on the top panel 60 as illustrated by the solid line in FIG. 4. Since a flow of gases into the center of the main accommodating space 21 is restricted by the gas shielding region 58, concentration of condensation on the center is alleviated. As a result, the cylindrical condensing layer 72 has a smaller height around the central axis A than that of the domed condensing layer as illustrated by the arrow D. Also, a height of the cylindrical condensing layer at an outer circumference is larger than that of the domed condensing layer as illustrated by the arrow E.

In this way, with the present embodiment, a height distribution on an upper surface of the condensing layer growing on the top panel front face 61 can be uniformed. Conforming the shape of the condensing layer 72 to the main accommodating space 21 enhances an accommodating efficiency of the condensing layer 72 in the main accommodating space 21. This enables the maximum amount of gas condensed in the cryopump 10 to be improved.

FIG. 5 is a schematic sectional side view of a main part of the cryopump 10 according to a second embodiment of the present invention. In the cryopump 10 according to the second embodiment, the second cryopanel 20 has a different arrangement from the first embodiment. All the rest of the second embodiment is the same or similar to the first embodiment. In the following description, description of similar components is omitted as needed to avoid redundancy.

As illustrated in FIG. 5, arrangement of the second cryopanel 20 is adjusted so that the width of the lateral gap 43 and the width of the gap part 44 may correspond to each other. As illustrated by the arrow F, the second cryopanel 20 is located to be away from the attaching pedestal 37 such that a center of the second cryopanel 20 is deviated from the central axis A. The second cryopanel 20 is off-centered from the central axis A so as to be away from a higher-temperature side of the refrigerator 16. In this manner, the lateral gap 43 is widened while the gap part 44 is narrowed on the opposite side across the central axis A. In the second embodiment, the top panel 60 does not have the cut-out portion 74. However, by virtue of the off-centered arrangement, the width of the gap surrounding the side surface of the condensing layer growing on the top panel 60 can be uniformed in a similar manner to that in the first embodiment. In an alternative embodiment, the second cryopanel 20 is arranged in the off-centered way and the top panel 60 has the cut-out portion 74.

Figure 6:
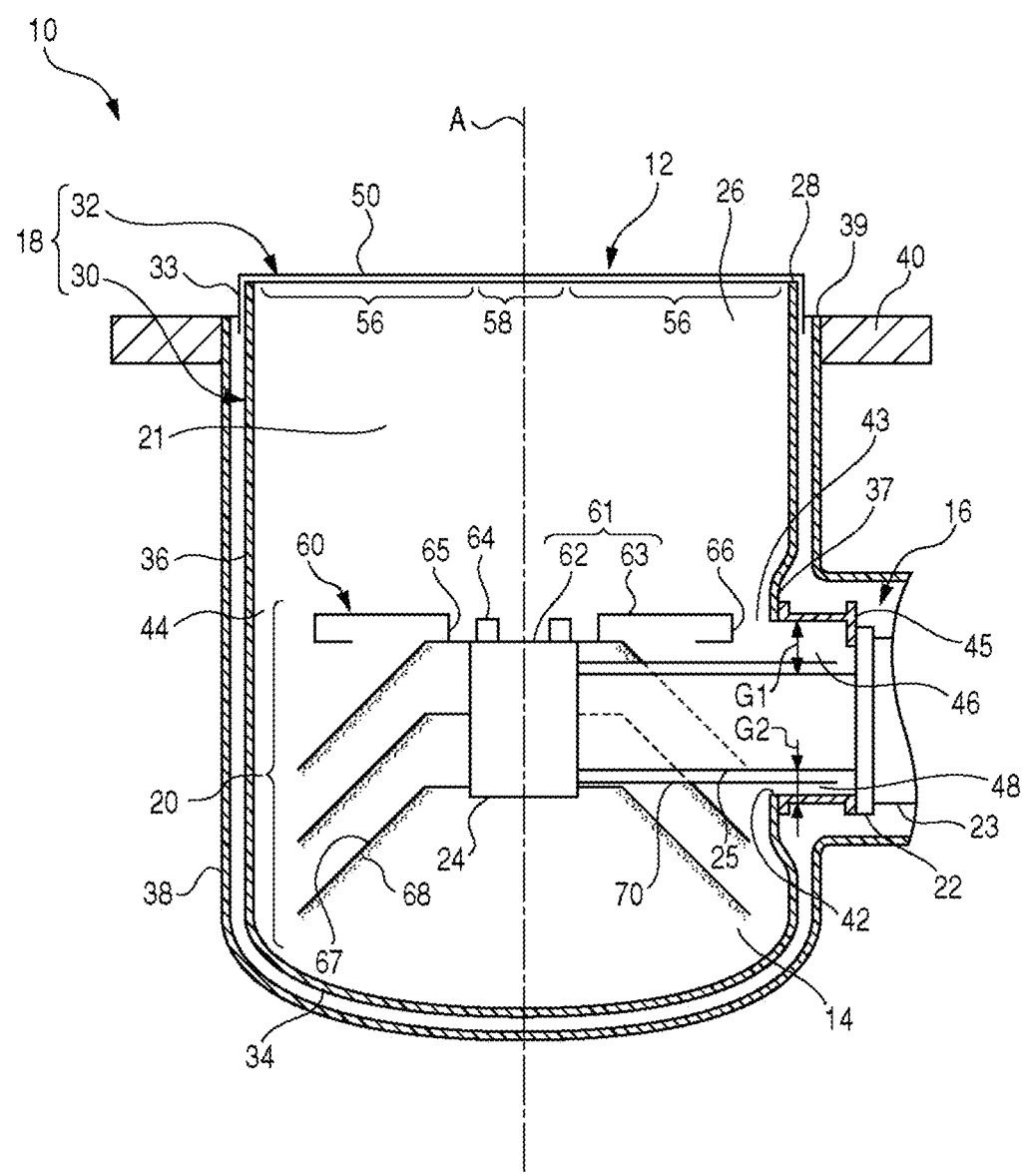
FIG. 6 is a schematic sectional side view of a main part of a cryopump according to a third embodiment of the present invention.

FIG. 6 is a schematic sectional side view of a main part of the cryopump 10 according to a third embodiment of the present invention. In the cryopump 10 according to the third embodiment, the refrigerator 16 has a different arrangement from those in the described embodiments. All the rest of the third embodiment is the same or similar to those of the described embodiments. In the following description, description of similar components is omitted as needed to avoid redundancy.

As illustrated in FIG. 6, the refrigerator 16 is arranged so that a width G1 of the upper gap 46 may be larger than a width G2 of the lower gap 48. By doing so, a space between the refrigerator cover 70 and the radiation shield 30 can be large. By widening the upper gap 46 in proximity to the main accommodating space 21, a larger amount of the condensing layer can be accommodated. Also, since the second cryopanel 20 is entirely moved downward, the main accommodating space 21 can be larger in the axial direction than in the described embodiments. In this way, the maximum amount of gas condensed in the cryopump 10 can be improved.

As described above, according to the embodiments of the present invention, the shape, location, orientation, and/or arrangement of the top panel 60 is determined such that the gap between the radiation shield 30 and the top panel 60 is substantially uniformed. This enables the cryopump 10 to mitigate the concentration of condensation on a specific part in the condensing layer deposited on the top panel 60. Accordingly, the accommodating efficiency of the condensing layer in the main accommodating space 21 is improved, and thereby the maximum amount of gas condensed in the cryopump 10 is increased.

Described above is an explanation based on the exemplary embodiments of the present invention. The invention is not limited to the above-mentioned embodiments, and various design modifications may be added. It will be obvious to those skilled in the art that such modifications are also within the scope of the present invention.

For example, the cryopump 10 can be configured by combining the configuration described in relation to one of the first to third embodiments with the configuration described in relation to another one of the first to third embodiments.

Also, the cryopump 10 may be provided with an inlet cryopanel disposed at the shield opening 26, instead of the plate member 32. The inlet cryopanel may include one or a plurality of flat (for example, disk) plates or louvers or chevrons formed in a concentric or lattice pattern. The gas passing region 56 and the gas shielding region 58 may be formed on the shield opening 26 by adjusting shapes, location, orientation, or intervals of the louver or chevron boards.

In the above embodiments, the plate member 32 is classified into two kinds of regions, that is, the gas passing region 56 and the gas shielding region 58. The plate member 32 may have three or more kinds of regions. As a third region, the plate member 32 may be provided with a region that is easier to let gases pass therethrough than the gas passing region 56 or a region that is harder to let gases pass therethrough than the gas shielding region 58.

The embodiments of the present invention can also be expressed in the following manner.

1. A cryopump comprising:
a refrigerator comprising a first stage and a second stage cooled to a lower temperature than that of the first stage;
a first cryopanel comprising a radiation shield having a main opening and a plate member across the main opening, the first cryopanel thermally connected to the first stage; and
a second cryopanel enclosed by the first cryopanel and thermally connected to the second stage, wherein
the plate member comprises a plate main portion and a peripheral portion adapted to attach the plate main portion to the radiation shield, and wherein
the plate main portion comprises a gas passing region having a multitude of pores through which gases pass to be condensed on the second cryopanel and a gas shielding region formed at a different position in the main body portion from that of the gas passing region.

2. The cryopump according to embodiment 1, wherein
the second cryopanel comprises a front face opposed to the plate main portion, the front face comprising a central region and an outside region surrounding the central region, and wherein
the gas passing region is opposed to the outside region while the gas shielding region is opposed to the central region.

3. The cryopump according to embodiment 1 or embodiment 2, wherein
the radiation shield comprises a side portion enclosing the second cryopanel, and between the side portion and the second cryopanel is formed a gap having a narrowed part, and wherein
the gas shielding region is formed at a position corresponding to the narrowed part.

4. The cryopump according to any one of embodiments 1 to 3, wherein
the radiation shield comprises an attaching pedestal located lateral to the second cryopanel for attachment of the refrigerator to the radiation shield, and an annular part adjacent to the attaching pedestal and enclosing the second cryopanel, wherein
between the second cryopanel and the attaching pedestal is formed a lateral gap, and between the second cryopanel and the annular part is formed an annular gap continuing into the lateral gap, and wherein
the second cryopanel is shaped or located such that the lateral gap is comparable in width to the annular gap.

5. The cryopump according to embodiment 4, wherein
the second cryopanel has a cut-out portion widening the lateral gap.

6. The cryopump according to embodiment 4 or embodiment 5, wherein
the second cryopanel is located to be away from the attaching pedestal such that a center of the second cryopanel is deviated from an axis passing the main opening.

7. The cryopump according to any one of embodiments 1 to 6, wherein
the radiation shield is provided with an attaching hole for the refrigerator, wherein
the refrigerator comprises a connecting portion connecting the first stage to the second stage, and the connecting portion is inserted into the attaching hole, and wherein
between the connecting portion and the attaching hole, an upper gap is formed on a side closer to the main opening, and a lower gap is formed on a side further away from the main opening, and a width of the upper gap is larger than a width of the lower gap.

8. A vacuum pumping method using a cryopump, wherein
the cryopump comprises a plate member across a main opening and a second cryopanel opposed to the plate member,
the method comprising:
cooling the plate member and the second cryopanel to a first temperature and a second temperature, which is lower than the first temperature, respectively;
receiving gases into a space between the plate member and the second cryopanel through a multitude of pores formed at apart of a surface of the plate member; and
condensing the gases on the second cryopanel.

9. A cryopump comprising:
a first cryopanel comprising a radiation shield having a main opening and a plate member across the main opening; and
a second cryopanel comprising a front face opposed to the plate member and cooled to a lower temperature than that of the first cryopanel, wherein the front face comprises a central region and an outside region surrounding the central region, and wherein the plate member comprises a gas passing region having a multitude of pores through which gases pass to be condensed on the second cryopanel and opposed to the outside region, and a gas shielding region opposed to the central region.

10. A cryopump comprising:
a first cryopanel comprising a radiation shield having a main opening and an inlet cryopanel disposed at the main opening; and
a second cryopanel enclosed by the first cryopanel and cooled to a lower temperature than that of the first cryopanel, wherein
the radiation shield comprises a side portion enclosing the second cryopanel, and between the side portion and the second cryopanel is formed a gap having a narrowed part, and wherein
the inlet cryopanel comprises a gas shielding region at a position corresponding to the narrowed part.

11. A cryopump comprising:
a refrigerator comprising a first stage and a second stage cooled to a lower temperature than that of the first stage;
a first cryopanel comprising a radiation shield having a main opening and an inlet cryopanel disposed at the main opening, the first cryopanel thermally connected to the first stage; and
a second cryopanel enclosed by the first cryopanel and thermally connected to the second stage, wherein
the radiation shield comprises an attaching pedestal located lateral to the second cryopanel for attachment of the refrigerator to the radiation shield, and a shield portion adjacent to the attaching pedestal and enclosing the second cryopanel, wherein
between the second cryopanel and the attaching pedestal is formed a lateral gap, and between the second cryopanel and the shield portion is formed a gap part continuing into the lateral gap, and wherein
the second cryopanel is shaped and/or located such that the lateral gap is comparable in width to the gap part.

12. The cryopump according to embodiment 11, wherein
the second cryopanel has a cut-out portion widening the lateral gap.

13. The cryopump according to embodiment 11 or embodiment 12, wherein
the second cryopanel is located to be away from the attaching pedestal such that a center of the second cryopanel is deviated from an axis passing the main opening.

14. The cryopump according to any one of embodiments 11 to 13, wherein
the second cryopanel comprises a front face opposed to the inlet cryopanel, the front face comprising a central region and an outside region surrounding the central region, and wherein
the inlet cryopanel comprises a gas passing region through which gases pass to be condensed on the second cryopanel and a gas shielding region, wherein the gas passing region is opposed to the outside region while the gas shielding region is opposed to the central region.

15. The cryopump according to embodiment 14, wherein
the gas passing region comprises a plate portion having a multitude of pores.

16. The cryopump according to any one of embodiments 11 to 15, wherein
the radiation shield is provided with an attaching hole for the refrigerator, wherein the refrigerator comprises a connecting portion connecting the first stage to the second stage, and the connecting portion is inserted into the attaching hole, and wherein between the connecting portion and the attaching hole, an upper gap is formed on a side closer to the main opening, and a lower gap is formed on a side further away from the main opening, and a width of the upper gap is larger than a width of the lower gap.

It should be understood that the invention is not limited to the above-described embodiment, but may be modified into various forms on the basis of the spirit of the invention. Additionally, the modifications are included in the scope of the invention.

Priority is claimed to Japanese Patent Application No. 2013-125819, filed on Jun. 14, 2013, the entire content of which is incorporated herein by reference.

What is claimed is:
1. A cryopump comprising:
a refrigerator orthogonally intersecting a central axis of the cryopump, the refrigerator comprising a first stage and a second stage cooled to a lower temperature than that of the first stage, the first stage and the second stage arranged in a refrigerator longitudinal direction being perpendicular to the central axis of the cryopump;
a first cryopanel comprising a radiation shield having a main opening and an inlet cryopanel disposed at the main opening, the first cryopanel thermally connected to the first stage;
a second cryopanel enclosed by the first cryopanel and thermally connected to the second stage, the second cryopanel comprising a plurality of cryopanels arranged along the central axis of the cryopump, the plurality of cryopanels including a top cryopanel facing the inlet cryopanel and arranged closest to the inlet cryopanel in the plurality of the cryopanels;
an attaching pedestal forming part of the radiation shield and arranged to attach the first stage of the refrigerator, the attaching pedestal located lateral to the top cryopanel in the refrigerator longitudinal direction; and
a shield portion forming part of the radiation shield and circumferentially adjoining the attaching pedestal so as to surround the top cryopanel,
wherein the top cryopanel extends perpendicularly to the central axis of the cryopump and is positioned at a top-cryopanel axial height,
wherein between the top cryopanel and the attaching pedestal is formed a lateral gap at the top-cryopanel axial height, and between the top cryopanel and the shield portion is formed a gap part at the top-cryopanel axial height, the lateral gap and the gap part in combination forming an annular gap between the top cryopanel and the radiation shield, and
wherein the top cryopanel comprises a cut-out portion at the top-cryopanel axial height, the cut-out portion is formed such that the lateral gap is equal in width to the gap part.

2. The cryopump according to claim 1, wherein
the top cryopanel comprises a front face opposed to the inlet cryopanel, the front face comprising a central region and an outside region surrounding the central region, and
the inlet cryopanel comprises a gas passing region through which gases pass to be condensed on the top cryopanel and a gas shielding region, the gas passing region is opposed to the outside region while the gas shielding region is opposed to the central region.

3. The cryopump according to claim 2, wherein
the gas passing region comprises a plate portion having a multitude of pores.

4. A cryopump comprising:
a refrigerator orthogonally intersecting a central axis of the cryopump, the refrigerator comprising a first stage and a second stage cooled to a lower temperature than that of the first stage, the first stage and the second stage arranged in a refrigerator longitudinal direction being perpendicular to the central axis of the cryopump;
a first cryopanel comprising a radiation shield having a main opening and an inlet cryopanel disposed at the main opening, the first cryopanel thermally connected to the first stage;
a second cryopanel enclosed by the first cryopanel and thermally connected to the second stage, the second cryopanel comprising a plurality of cryopanels arranged along the central axis of the cryopump, the plurality of cryopanels including a top cryopanel facing the inlet cryopanel and arranged closest to the inlet cryopanel in the plurality of the cryopanels;
an attaching pedestal forming part of the radiation shield and arranged to attach the first stage of the refrigerator, the attaching pedestal located lateral to the top cryopanel in the refrigerator longitudinal direction; and
a shield portion forming part of the radiation shield and circumferentially adjoining the attaching pedestal so as to surround the top cryopanel,
wherein the top cryopanel extends perpendicularly to the central axis of the cryopump and is positioned at a top-cryopanel axial height,
wherein between the top cryopanel and the attaching pedestal is formed a lateral gap at the top-cryopanel axial height, and between the top cryopanel and the shield portion is formed a gap part at the top-cryopanel axial height, the lateral gap and the gap part in combination forming an annular gap between the top cryopanel and the radiation shield, and
wherein the top cryopanel comprises a cut-out portion at the top-cryopanel axial height, the cut-out portion formed is such that the lateral gap is equal in width to the gap part,
wherein, as viewed along the central axis of the cryopump, the cut-out portion forms a chord located at the top-cryopanel axial height adjacent to the attaching pedestal to form the lateral gap between the chord and the attaching pedestal.

5. A cryopump comprising:
a refrigerator orthogonally intersecting a central axis of the cryopump, the refrigerator comprising a first stage and a second stage cooled to a lower temperature than that of the first stage, the first stage and the second stage arranged in a refrigerator longitudinal direction being perpendicular to the central axis of the cryopump;
a first cryopanel comprising a radiation shield having a main opening and an inlet cryopanel disposed at the main opening, the first cryopanel thermally connected to the first stage;
a second cryopanel enclosed by the first cryopanel and thermally connected to the second stage, the second cryopanel comprising a plurality of cryopanels arranged along the central axis of the cryopump, the plurality of cryopanels including a top cryopanel facing the inlet cryopanel and arranged closest to the inlet cryopanel in the plurality of the cryopanels;
an attaching pedestal forming part of the radiation shield and arranged to attach the first stage of the refrigerator, the attaching pedestal located lateral to the top cryopanel in the refrigerator longitudinal direction; and
a shield portion forming part of the radiation shield and circumferentially adjoining the attaching pedestal so as to surround the top cryopanel,
wherein the top cryopanel extends perpendicularly to the central axis of the cryopump and is positioned at a top-cryopanel axial height,
wherein between the top cryopanel and the attaching pedestal is formed a lateral gap at the top-cryopanel axial height, and between the top cryopanel and the shield portion is formed a gap part at the top-cryopanel axial height, the lateral gap and the gap part in combination forming an annular gap between the top cryopanel and the radiation shield, and
wherein the top cryopanel comprises a cut-out portion at the top-cryopanel axial height, the cut-out portion formed is such that the lateral gap is equal in width to the gap part,
wherein, the lateral gap is formed between the cut-out portion of the top cryopanel and the attaching pedestal and the gap part is formed between a remaining portion of the top cryopanel and the shield portion,
as viewed along the central axis of the cryopump, the cut-out portion and the remaining portion of the top cryopanel form a first top cryopanel outline and a second top cryopanel outline, respectively, and the attaching pedestal and the shield portion form an attaching pedestal outline and a shield portion outline, respectively,
the lateral gap having a first constant width is defined along and between the first top cryopanel outline and the attaching pedestal outline,
the gap part having a second constant width is defined along and between the second top cryopanel outline and the shield portion outline, the second constant width being equal to the first constant width at the top-cryopanel axial height.

6. The cryopump according to claim 5, wherein
the first top cryopanel outline and the attaching pedestal outline are straight lines and the second top cryopanel outline and the shield portion outline are arcs.

* * * * *